United States Patent [19]

Vertut

[11] 4,283,165

[45] Aug. 11, 1981

[54] MOTORIZED MANIPULATOR OF THE CABLE TRANSMISSION TYPE HAVING AN INCREASED FIELD OF ACTION

[75] Inventor: Jean Vertut, Issy-les-Moulineaux, France

[73] Assignee: Commissariat a l'Energie Atomique, Paris, France

[21] Appl. No.: 72,246

[22] Filed: Sep. 4, 1979

[30] Foreign Application Priority Data

Sep. 4, 1978 [FR] France ............................ 78 25413

[51] Int. Cl.³ .............................................. B25J 5/00
[52] U.S. Cl. ................................. 414/733; 180/19 S; 280/771; 414/738
[58] Field of Search ............... 414/7, 719, 720, 729, 414/732, 733, 735, 738, 742, 709; 280/91, 771; 180/19 S

[56] References Cited

U.S. PATENT DOCUMENTS

| | | | |
|---|---|---|---|
| 3,268,092 | 8/1966 | Hainer et al. | 414/729 |
| 3,297,337 | 1/1967 | Sargent | 280/91 |
| 3,587,872 | 6/1971 | Pauly | 414/732 |
| 3,664,517 | 5/1972 | Germond et al. | 414/7 |
| 3,669,466 | 6/1972 | Spence | 280/91 |
| 3,790,002 | 2/1974 | Germond et al. | 414/735 |

FOREIGN PATENT DOCUMENTS 2086976 12/1971 France ................................ 414/720
2278457 2/1976 France.

Primary Examiner—Robert J. Spar
Assistant Examiner—Fred A. Silverberg
Attorney, Agent, or Firm—Kerkam, Stowell, Kondracki & Clarke

[57] ABSTRACT

Motorized manipulator, wherein it comprises a body, a shaft which rotates about its longitudinal axis with respect to the body, an upper arm articulated to the end of the shaft about a shoulder axis orthogonal to the longitudinal axis of the shaft and to the longitudinal axis of the arm, an intermediate arm directly articulated to the end of the upper arm about an elbow axis parallel to the shoulder axis, a forearm articulated to the end of the intermediate arm about a third axis parallel to the elbow axis, the forearm being able to rotate about its longitudinal axis, a tool having a longitudinal axis mounted in pivotal manner at the end of the forearm about an axis perpendicular to the plane defined by the longitudinal axes of the forearm and the tool, the latter being able to rotate about its longitudinal axis and a plurality of motors fixed to the body and a transmission including cables and pulleys for transmitting the control movements of the motors to the corresponding moving members of the manipulator.

13 Claims, 14 Drawing Figures

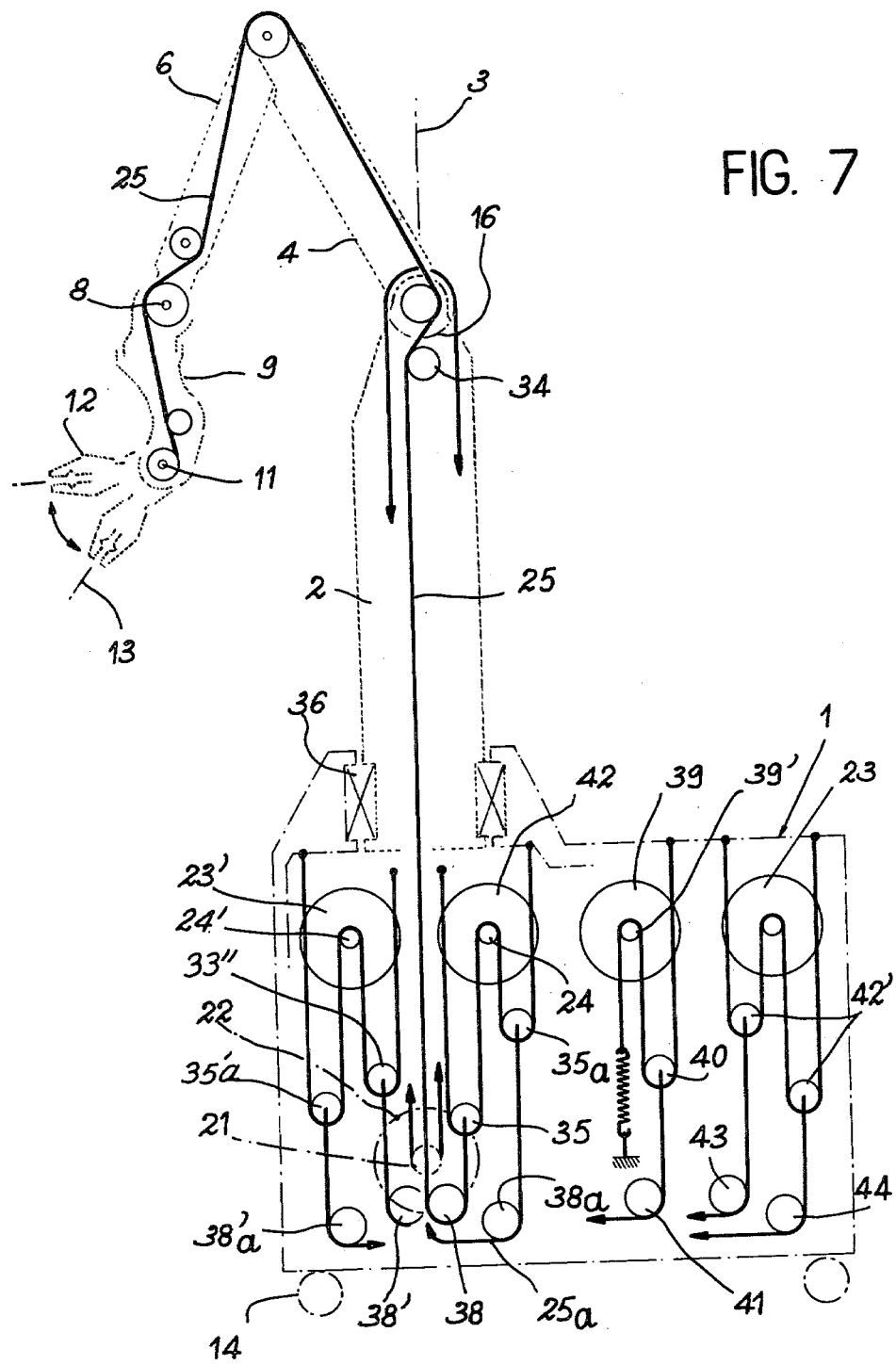

MOTORIZED MANIPULATOR OF THE CABLE TRANSMISSION TYPE HAVING AN INCREASED FIELD OF ACTION

BACKGROUND OF THE INVENTION

The present invention relates to a motorized manipulator.

Numerous articulated motorized manipulators are already known and they are generally used on the basis of a support and are either suspended on a mobile overhead crane or are carried by a vehicle supported on the ground, in this way becoming autonomous.

In general, these manipulations comprise two articulated segments carrying at their end tongs or more generally a tool. These two segments are generally called the "arm" and the "forearm" respectively. The assembly has 6° of freedom permitting the position and orientation of an object held by the tongs in all positions and orientations within the limits of the manipulator displacement possibilities. To this end in the case of such manipulators, there is generally a rotation of the forearm about its own axis and the joint of the wrist, i.e. the joint between the forearm and the tool provides the two complimentary rotations. These three rotation movements essentially constitute the degrees of freedom of orientation of the tool, whilst the movements of the elbow, i.e. about the joint between the arm and the forearm, the movement of the shoulder, i.e. between the arm and the support and the rotation movement of the whole manipulator generally constitute the degrees of freedom of position. This arrangement has the disadvantage of opposing the advance of the tool when it is a question of placing the wrist carrying the tool in areas having large obstacles. Thus, in order that the degrees of freedom of orientation are linked to only a limited extent with the degrees of freedom in position the last arm of the lever, under the circumstances, the lever arm of the tongs, must have a limited length compared with the length of the previous segments constituting the arm and the forearm. As a result, the long segment constituted by the forearm limits the approach of the tongs or tool in obstructed areas. Thus, to a certain extent, these obstacles constitute shadow areas which cannot be entered by the tool.

Moreover, the manipulators can be subject to the action of a control using a computer and permitting the solution by cartesian coordinates of the positions of the manipulator according to its own degrees of freedom and conversely the solution of the cartesian coordinates of the tongs. This leads to a complex calculation necessitating the inversion of several matrixes because there is a connection between the orientation movements of the tongs or the tool and the position movements of the manipulator. Thus, even in the standard arrangement where the articulation axis of the wrist is offset with respect to the forearm axis, the change of coordinates is particularly complex and requires a calculation by iterations effected by the computer.

The manipulator according to the invention makes it possible to isolate the orientation movements from the position movements, which considerably simplifies its control by computer.

Finally, numerous manipulators are known, which are generally used industrially and rest directly on the ground by their stand. The manipulator according to the invention makes it possible to obtain the support on the ground with a significant mobility, which greatly increases its intervention area, whereby the manipulator becomes autonomous and has a much greater field of action.

BRIEF SUMMARY OF THE INVENTION

A first object of the invention is to provide a manipulator having a body, a shaft which is rotatable about its longitudinal axis with respect to the body, an upper arm articulated to the end of the shaft about a shoulder axis orthogonal to the shaft axis, an intermediate arm articulated directly to the end of the arm about an elbow axis parallel to the shoulder axis, a lower arm or forearm articulated to the end of said intermediate arm about a third axis parallel to the elbow axis, said lower arm rotating about its own longitudinal axis and carrying at its end tongs having a rotary movement with respect to the lower arm about an axis orthogonal to the longitudinal axis of the lower arm and a rotary movement about its own axis, the manipulator also having a motor for controlling each movement, said motors being fixed to said body and transmission means by cables and pulleys for controlling the movements of said members from the said motors.

It is thus apparent that in the basic embodiment of the invention, attachment of the forearm or lower arm to the shaft, to the upper arm and to the intermediate arm makes is possible to significantly increase the possibilities of skilful manipulation of the tongs fixed to the end of the manipulator.

Another object of the invention is to attach to the manipulator defined hereinbefore means for controlling the movements about the third axis in such a way that the longitudinal axis of the lower arm remains parallel to the longitudinal axis of the shaft.

According to this embodiment, it is obvious that in connection with the control of the manipulator by a computer the position of the tongs rotation axis with respect to the forearm is only dependent on the rotations of the shaft and of the upper and intermediate arms and as if the forearm did not exist, whilst improving the possibilities of reaching an article in spite of any obstacles which may be present.

Another object of the present invention is a manipulator of the type described hereinbefore in which the body is mounted in wheels, thus making the manipulator autonomous, the longitudinal axis of the shaft being vertical.

Another object of the invention is an autonomous manipulator of the type described hereinbefore in which there is a connection between the direction of the upper arm and of the intermediate arm (rotation of the shaft) and the direction of the wheels of the manipulator body. More specifically, the direction of the wheels, i.e. the direction of advance of the manipulator body coincides with the orientation of the upper arm/intermediate arm assembly with respect to the body. It is clear that in this way the displacement orders of the manipulator assembly are optimised for reaching a given object.

According to a constructional variant of the manipulator according to the invention, the body comprises a control member for pivoting the lower arm about a third axis relative to the intermediate arm. It is clear that after bringing about this pivoting by a given angle the lower arm permanently uses this angle during movements of other components of the manipulator.

According to another feature, the manipulator can have balancing means comprising a first spring, whose one end is fixed to a lever which pivots about the shoulder axis and is forced to remain parallel to the longitudinal axis of the intermediate arm and whose other end is fixed to the shaft, and a second spring whose one end is fixed to a lever extending the longitudinal axis of the upper arm and whose other end is fixed to the shaft.

BRIEF DESCRIPTION OF THE DRAWINGS

The invention will be described in greater detail hereinafter relative to non-limitative embodiments and the attached drawings, wherein show:

FIG. 6' an extreme position of the forearm.

FIG. 7 a view of the manipulator base showing the connection between the drive motors and the cables for performing the different movements.

DETAILED DESCRIPTION OF THE PREFERRED EMBODIMENTS

Figure 1:
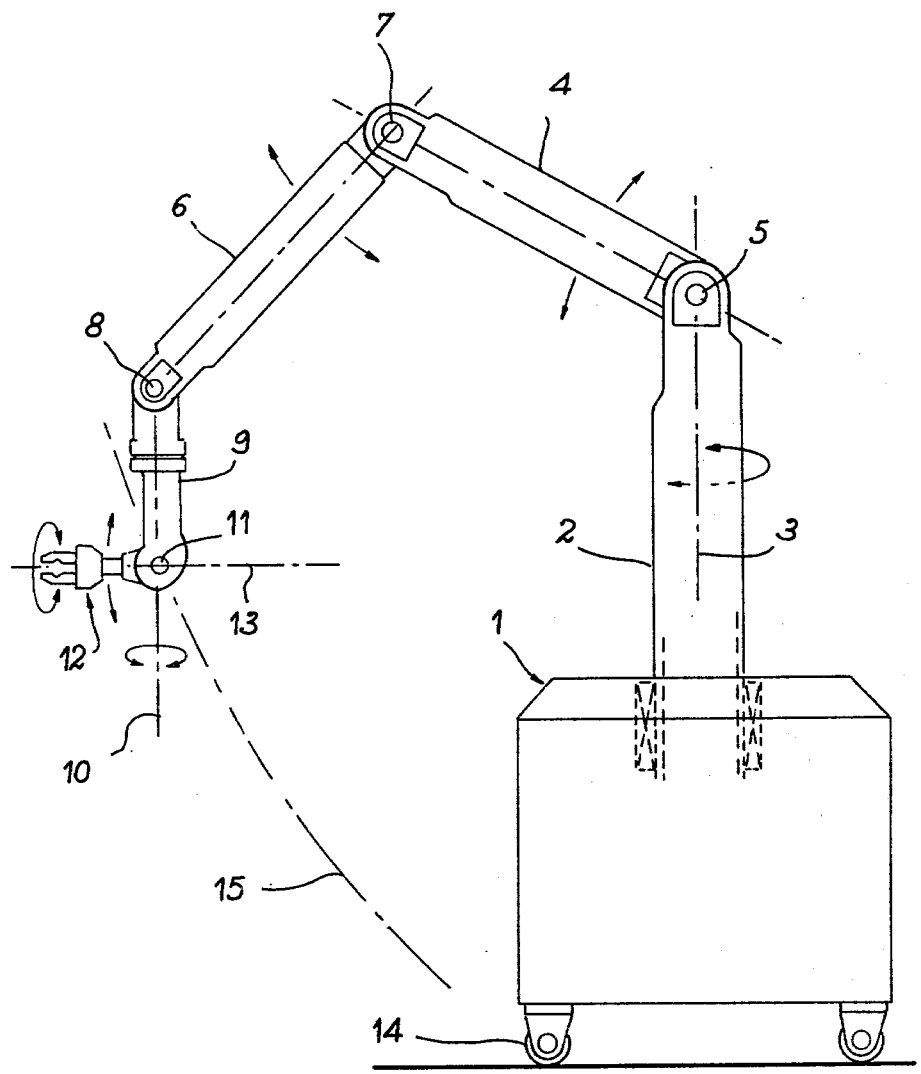
FIG. 1 a simplified view of the manipulator showing its different components, as well as the different possibilities of moving one component relative to the others.

FIG. 1 shows in simplified manner, the complete manipulator in order to show the various possible movements and the various components of said manipulator. There is firstly a body 1 which serves as a base for the manipulator and which is movable with respect to the ground by means of four pivoting wheels 14. A cylindrical shaft 2 is mounted on body 1 so as to pivot about its longitudinal axis 3. Axis 3 is shown vertical here. On shaft 2 is articulated a first member, which is called here the upper arm and which can pivot relative to shaft 2 about an axis 5 perpendicular respectively to the longitudinal axis of upper arm 4 and to the longitudinal axis of shaft 2 and which is called the shoulder axis. In FIG. 1, these three axes are shown in concurrent manner, but it is obvious and as will be shown hereinafter that this arrangement is not necessary. On the second end of upper arm 4 is pivotally mounted a second segment or intermediate arm 6, which can pivot about the axis 7. Axis 7 is perpendicular to the plane defined by the longitudinal axes of upper arm 4 and intermediate arm 6 and is called the elbow axis. On the second end of intermediate arm 6 is pivotally mounted a third segment of forearm 9 which can pivot about an axis 8 parallel to axes 5 and 7. According to a preferred arrangement in accordance with the invention, forearm 9 has a reduced length and rotates about its longitudinal axis 10 in such a way that axis 10 remains permanently parallel to axis 3 of shaft 2. The means for maintaining this parallelism will be explained hereinafter. Tongs 12 are mounted on the second end of forearm 9. The tongs are able to pivot on the one hand about axis 11, disposed in a plane perpendicular to axis 10 of forearm 9 and in a plane perpendicular to the longitudinal axis 13 of tongs 12. Finally, tongs 12 can pivot about its longitudinal axis 13.

This drawing also shows the limit 15 reached by axis 11 in the maximum extension position of upper arm 4 and of intermediate arm 6. It is also readily apparent that by giving forearm 9 a supplementary rotary movement about axis 8, it is possible to slightly increase the field shown by limits 15. In this way, it is possible to reach obstructed areas which could not be reached by forearm 9 or more specifically by tongs 12.

Another vital feature of the manipulator is that the motors driving the various movements of the articulated components of the manipulator are all located in body 1.

These various movements can at the minimum be a rotary movement about axis 3 of shaft 2, a shoulder movement around axis 5, an elbow movement around axis 7, a rotation around axis 10 parallel to axis 3 in the preferred arrangement, a lifting movement of tongs 12 about axis 11 and a rotary movement of said tongs about their own axis 13. These six movements which correspond to six degrees of freedom are completed by a seventh movement corresponding to the closing of tongs 12 and which is a feature of all manipulators. The manipulator according to the invention also has auxiliary or complimentary movements such as the optional pivotal movement of forearm 9 about axis 8, the operation of wheels such as 14 and their orientation, so that there are in all six possible movements, six degrees of freedom, the closing of the tongs and the three auxiliary movements constituting redundancies.

According to the preferred embodiment of the invention in which axis 10 is parallel to axis 3, the redundancies are reduced to six movements inherent in the manipulator and as will be shown hereinafter, the overall movement about axis 3 in accordance with a preferred embodiment of the invention controls the orientation of the wheels, thus eliminating a second redundancy. Moreover, during its control, the rotation of the wheels, i.e. the propulsion of body 1 on the ground is controlled when the manipulator is at the end of the extension movement travel about the elbow axis 7 in an appropriate direction in such a way that the displacment of body 1 is only controlled when the field, through its limits 15, does not permit the object to be reached.

The method of controlling the upper arm 4 will now be described with reference to FIG. 2. This control method has already been described in French Patent application EN 74 25055 filed by the present Applicant on July 18, 1974 and entitled "Motorized manipulator with cable".

Upper arm 4 is fixed to a pulley 16 mounted on the axis of shoulder 5. This pulley is displaced with respect to the axis 3 of the shaft. Pulley 16 is rotated by means of a motor 22 fixed to body 1. For this purpose, two opposing strands 17, 17a pass over pulley 16 and are fixed to the moving part 18 and 18a of two blocks, whose fixed portions 19 and 19a are fixed to shaft 2. Their two opposing sides leaving the blocks are fixed to capstan 21 driven by motor 22 after passing over return pulleys 20 and 20a fixed to shaft 2. The function of these two pulleys is to return the strands to the vicinity of axis 3 of shaft 2. Thus, motor 22 brings about the rotation of pulley 16 and consequently arm 4.

Figure 3:
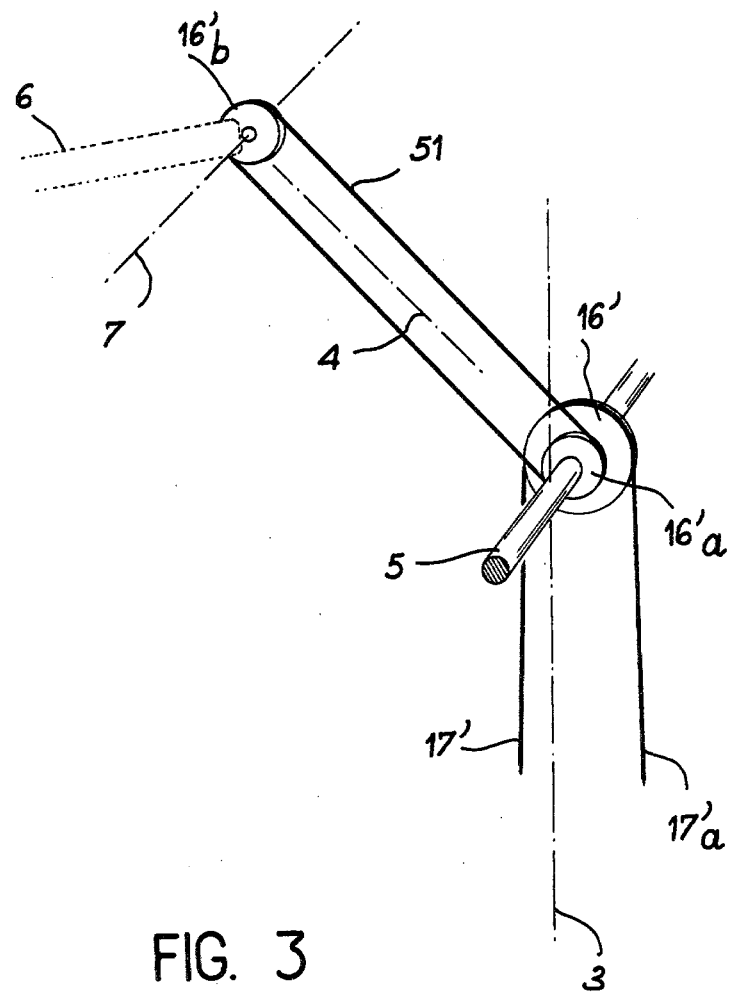
FIG. 3 a simplified view of the rotary control of the intermediate arm with respect to the upper arm.

FIG. 3 diagrammatically shows the control of the rotation of intermediate arms 6 with respect to upper arm 4. To this end, a pulley 16' mounted on spindle 5 is arranged symmetrically of pulley 16 with respect to axis 3. Pulley 16' is driven by two opposing strands 17'a and 17' driven by a motor 22' and a capstan 21' (not shown). A pulley 16'a fixed to pulley 16' cooperates with a pulley 16'b pivotally mounted on elbow axis 7 and fixed to the intermediate arm 6. The movements of pulley 16'a are transmitted to pulley 16'b by a cable 51.

Figure 2:
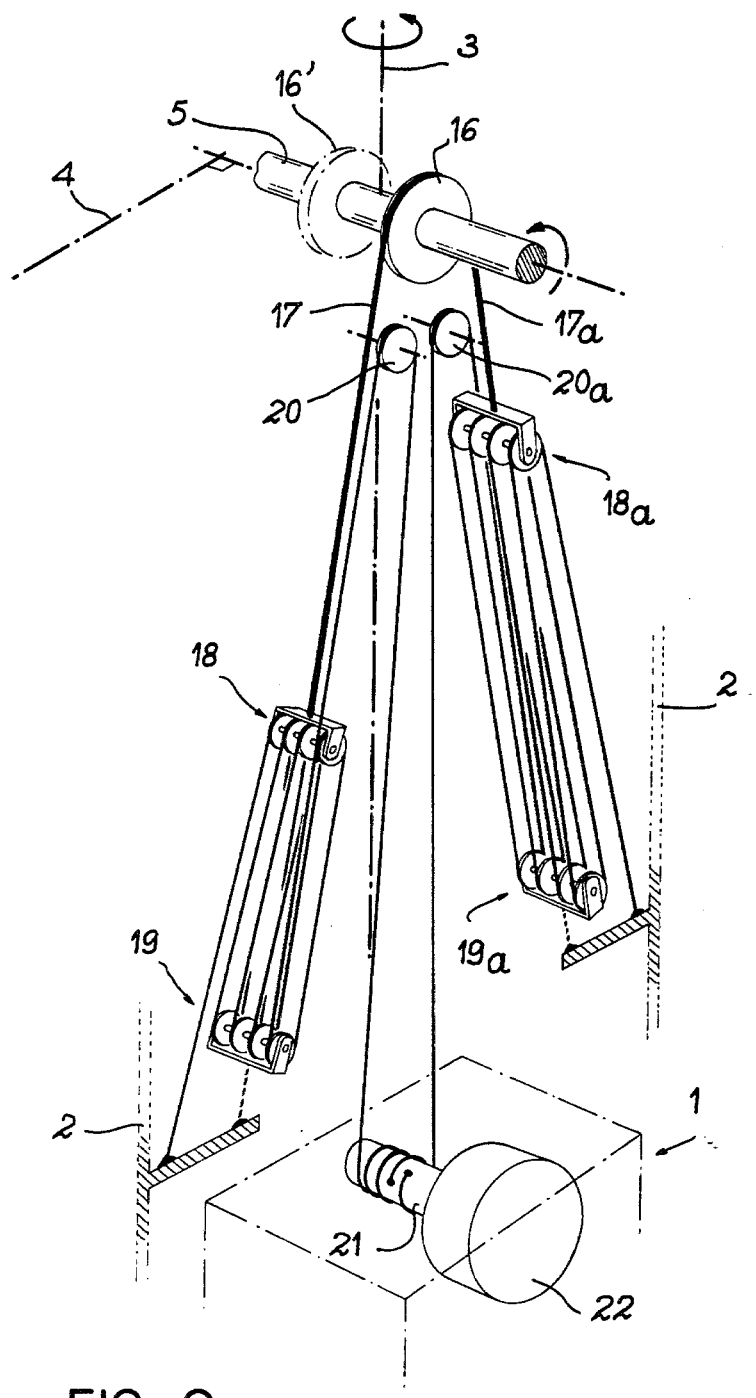
FIG. 2 the control by chain, line or cable of the rotation movement of the arm with respect to the shaft.

It should be noted with reference to FIG. 2 that on leaving the blocks, the drive cables pass over return pulleys 20 and 20', whose axes are integral with the shaft 2. The function of said pulleys is to return the strands passing up to capstan 21 as close as possible to the shaft pivot axis 3. As has been pointed out hereinbefore, capstan 21 or more specifically motor 22 is fixed to body 1. By bringing the strands as close as possible to the shaft axis 3 it is possible to facilitate the torsion of the layer of cables during the rotation of the shaft with a reduced length variation of the cable paths, whereby their tension is varied in an acceptable manner.

Figure 4:
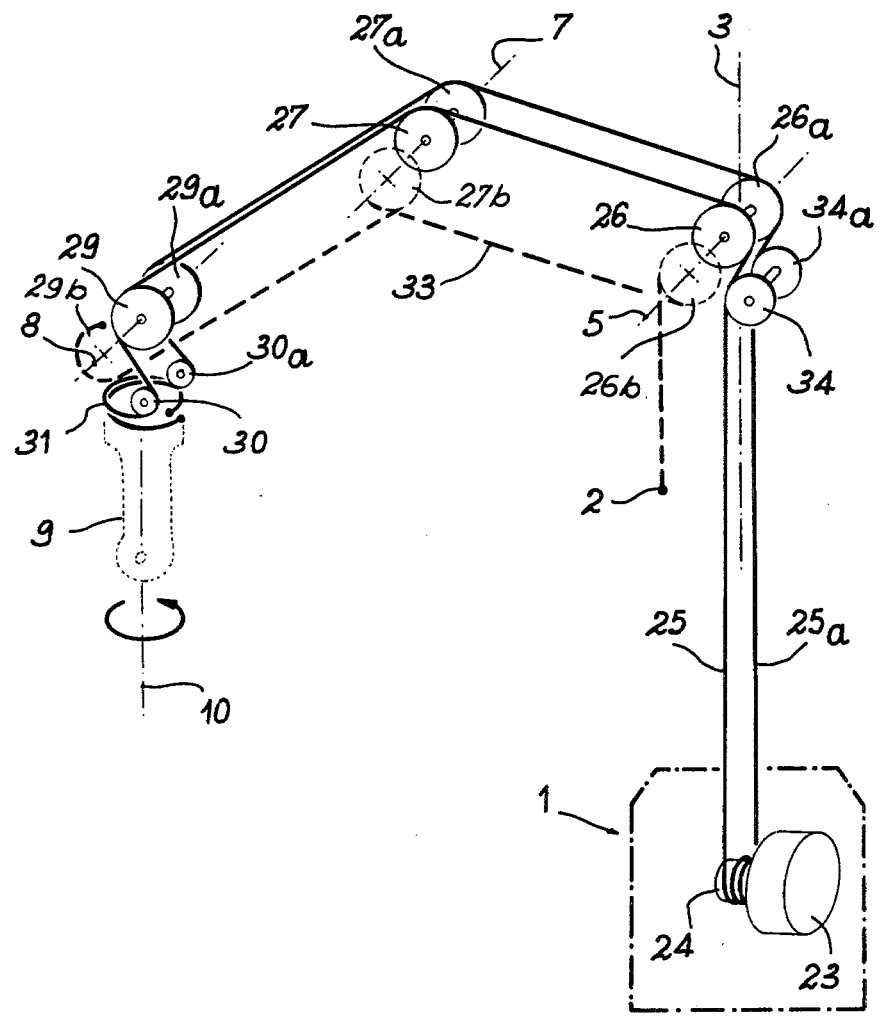
FIG. 4 a view of the manipulator showing the control of the displacement of the lower arm or forearm for maintaining the latter parallel to the manipulator shaft.

FIG. 4 shows the rotation control of forearm 9 about its longitudinal axis 10. This movement is controlled by motor 23, integral with body 1 on whose output shaft is mounted capstan 24. Two opposing strands 25 and 25' are fixed to the said capstan. They pass over pulleys 26 and 26a pivotably mounted on shoulder axis 5, then on pulleys 27 and 27a pivotably mounted on elbow axis 7 and finally on pulleys 29, 29a pivotably mounted on the third axis 8, all these pulleys having the same diameter. The upper part of lower arm 9 is fixed to a pulley whose axis coincides with axis 10 and which carries reference numeral 31. Pulleys 30 and 30a return the opposing strands 25, 25a to pulley 31 on leaving pulleys 29, 29a. Moreover, pulleys 34, 34a located in shaft 3 return the strands 25, 25a to the vicinity of axis 3 of shaft 2 during their travel between capstan 24 and pulleys 26, 26a for reasons indicated hereinbefore.

Opposing strands similar to strands 25, 25a serve in the same way to control the rotation of tongs 12 about axis 11 and the rotation of the tongs about their own axis 13. As these arrangements are well known (see the patent referred to hereinbefore) there is no need to describe them, in greater detail. Thus, there are three pairs of opposing strands which pivot the forearm 9 about axis 8 as a result of the tension thereof. Furthermore, from its driving capstan such as 24 to its driven pulley such as 31, a pair of opposing cables has a free length of passage on the pairs of pulleys 26, 26a, 27, 27a, 29, 29a which is constant during the opposed relative displacements corresponding to the rotations of capstans 24 and 31. This opposing pair behaves with respect to the axes 5, 7 and 8 like branches of constant length equivalent to the sides of a parallelogram (in the tension direction only). It is for this reason that according to a feature of the invention, one or more opposing strands such as 33 are placed on pulleys 26b, 27b, 29b, which are identical to one another and have the same diameter and are also similar to pulleys 26, 27 and 29. As the said strand 33 is mounted in an opposing path with respect to strands 25, strands 33 having a constant length balance the tensions of cables such as 25 and 25' and positively maintain axis 10 parallel to axis 3, being equivalent to the closing of the parallelograms. It should be noted that pulleys such as 27b intended for cable 33 are wound by more than half a turn. If the cable is present, it passes into a pulley having two grooves and then from one groove to the other in such a way as to prevent friction of the two strands of the cable. The same applies to pulley 26b, beyond which strand 33 is fixed to shaft 2. Thus, forearm 9 remains parallel to the shaft.

Figure 5:
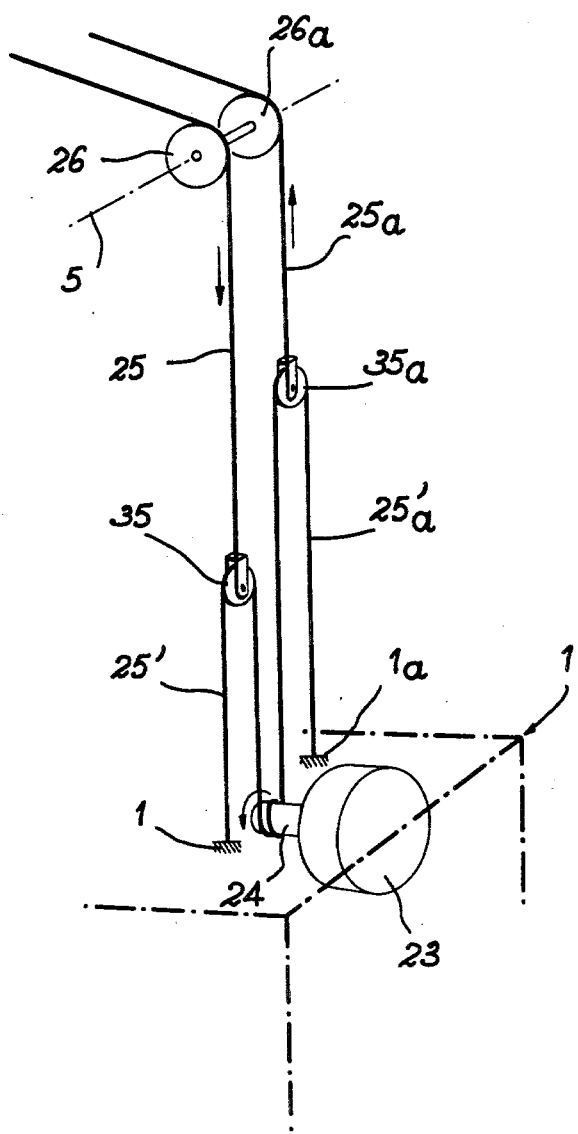
FIG. 5 a partial view showing a variant of the forearm control.

FIG. 5 shows a partial view of a constructional variant of the control of strands 25, 25a. Strands 25, 25a are fixed to the movable part 35, 35a of step-up by two blocks. These blocks are controlled by opposing strands 25', 25'a passing onto capstan 24 and whose other ends are fixed to body 1. According to the characteristics of the motor it is possible to bring about this arrangement with blocks stepped up by an appropriate integer.

It should be noted in FIG. 4 in the example described that both with respect to the shoulder joint and the elbow joints the three axes involved by each joint coincide. This involves the pivot axis 5, the longitudinal axis 3 of the shaft and the longitudinal axis of upper arm 4 in the case of the shoulder joint. It involves the pivot axis 8, the longitudinal axis of the intermediate arm and axis 10 of forearm 9 in the case of the wrist joint. As a result, in the preferred case where axis 10 is kept parallel to axis 3, the attachment point 11 of tongs 12 is at a distance from axis 3 equal to the projection on a horizontal plane of segments 4 and 6. This is optimum for calculating the conversion of the cartesian coordinates into angles of the segments of the arm. This calculation takes place during the control by a manipulator programme.

Figure 6:
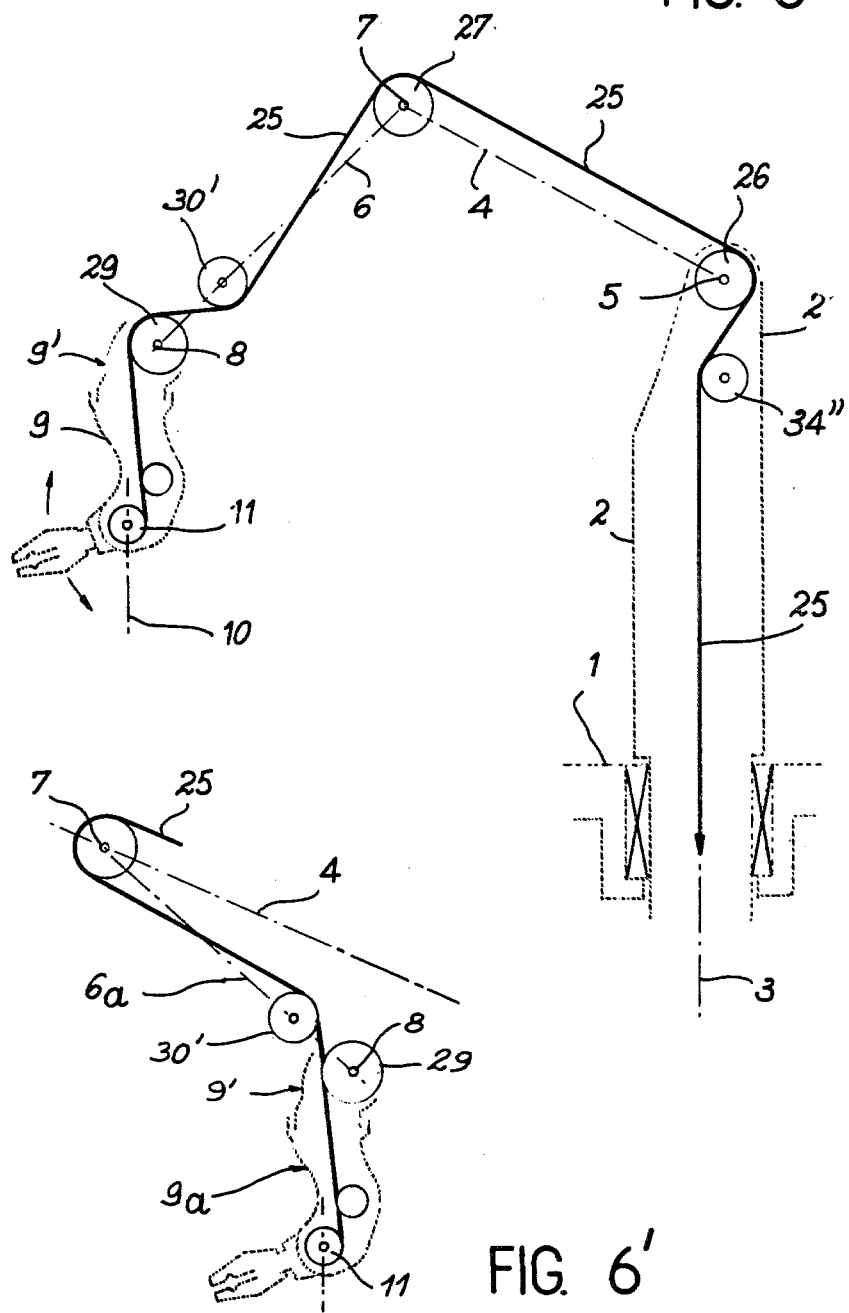
FIG. 6 a view showing a constructional variant of the manipulator in which the longitudinal axes of the forearm and the shaft are displaced relative to the rotation axes of the upper arm and the forearm.

However, according to the variant shown in FIG. 6, the same result can be obtained even when the axes or groups of axes considered hereinbefore do not coincide. In particular, the forearm 9 in FIG. 6 is not mounted so as to pivot directly about axis 8 and is instead mounted at the end of a shell 9', which in turn is mounted so as to pivot about axis 8. The off-centering is such that strand 25 passing towards joint 11 is tangential to pulley 29. To ensure that strand 25 remains in contact with pulley 29 for the extreme positions shown in FIG. 6' (positions 6a and 9a respectively of the intermediate arm and the forearm 9) a return pulley 30' mounted on intermediate arm 6 is added.

It is then necessary to provide level with the shoulder joint which must be offset in the same way by means of shell 2' a return pulley e.g. 34" ensuring with respect to pulley 26 the offsetting of cables 25 in the vicinity of axis 3. These arrangements lighten the forearm 9 and make it possible to bring about returns with large diameter pulleys which in no way reduce the resistance to fatigue of the cables.

FIG. 7 shows the complete manipulator and in particular the manipulator body 1 in order to illustrate the way in which the various cables, lines or chains are controlled by means of the motors referred to hereinbefore. This drawing more specifically shows the connection with the motors permitting the lifting movements of the tongs and the rotary movement of said tongs about their longitudinal axis. A control cable 25 for such a movement which is brought into the vicinity of axis 3 of the shaft passes over a guide pulley 38 mounted so as to pivot with respect to body 1 and said cable is fixed to the movable part of a diagrammatically represented block 35. The opposing strand 25a passes over a return pulley 38a mounted in the same way and the end of cable 25a is fixed to the movable part of a second pulley 35a. Each of these two opposing blocks has an end fixed to body 1 and their other end is fixed to capstan 24 driven by motor 42.

The left-hand part of FIG. 7 shows in a very similar arrangement the driving of a cable like 25 permitting the raising and lowering of tongs 12 about axis 11, being provided in per se known manner level with axis 11 by a differential gear. Once again, there is a motor 23', the return pulley 38' and capstan 25'. For the opposing strand of type 25a, there is a return pulley 38'a, capstan 35'a, whereby the two opposing blocks are driven by capstan 24' mounted on the shaft of motor 23'. Obviously, the opposing strands of type 25a pass over a second return pulley identical and aligned with pulleys 38'. Motor 39 with its capstan 39' bring about the closing of the tongs. Motor 39 is positioned as close as possible to motor 42 and at a slightly lower level because the travel of block 40 associated therewith must be shorter. The cable of type 25 which controls the closing of the tongs passes over a return pulley 41, then onto a pulley identical to pulley 38. Finally and further to the right it is possible to see motor 23 which brings about the rotation of the end segment 9 about axis 10. The travel of this movement is high, so that motor 23 is placed as high as possible in body 1 and the two opposing blocks 42' and 42'a are shown, together with the return pulleys 43 and 44 of the two opposing strands, which are again directed in accordance with axis 3 of the shaft by other return pulleys such as 38 placed on a same axis integral with body 1.

Figure 8A:
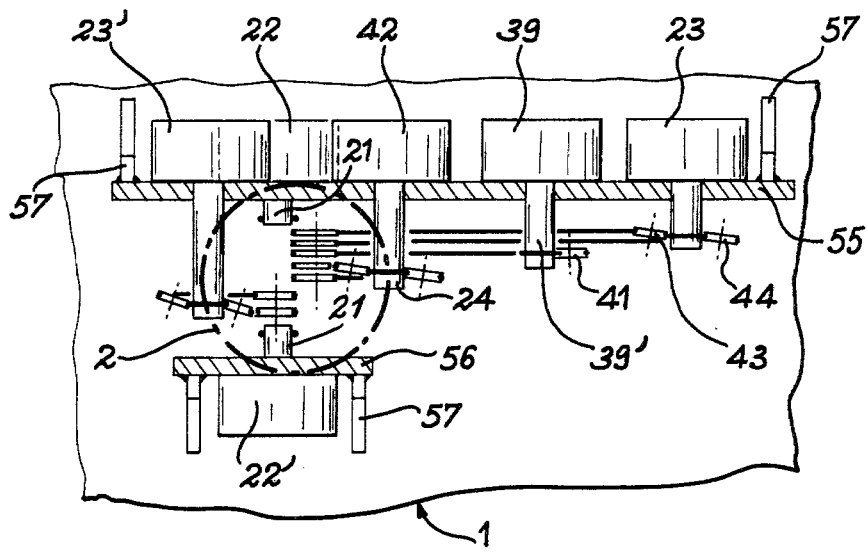
FIG. 8a a plan view of the manipulator base showing the installation of the motors.

Thus, all the four motors shown can be positioned in the same fixed plane and are fixed onto a vertical plate 55 of the body in FIG. 8a. Moreover, the cables 25, 25a are returned substantially in accordance with shaft axis 3. There are in all seven cables, the thickness of the corresponding layer being approximately 40 mm. Thus, the cabling is very easy to realise. Moreover, all the block cables are attached to the top of body 1, where their tension is easy to adjust through the fixing point 1.

Motors 22 and 22' responsible for bringing about the movement about pivot axes 5 and 7 are shown in greater detail in FIG. 8a.

The corresponding capstans 21 and 21' are arranged symmetrically with respect to the shaft axis 3. More specifically, motor 22 is fixed to vertical plate 55 of body 1, whilst motor 22' is fixed to the opposite plate 56 which is smaller. The devices for obtaining the rotational movement of the shaft are not shown in this drawing. They are in fact shown in FIG. 8b. The plates 55 and 56 are fixed to the base plate 1 by four angle plates 57, giving a completely free access to the cabling according to this first embodiment.

Shaft 3 is rotated by a motor 45 which transmits this rotation via a two-stage reduction gear realised by cables which make a number of turns on helical pulleys. Motor 45, which constitutes the seventh motor of the manipulator is fixed to an upper horizontal plate of body 1, which is also fixed by an angle plate.

It is clear that the construction obtained in this way gives very easy access after removing a cover for the purpose of fitting the motors and particularly for fitting the transmission cables ensuring the various movements.

Finally, according to a special feature of the invention it can be seen that shaft 2 controlled by a pulley 46 from a motor 45 simultaneously brings about the pivoting of three wheels 14a, 14b, 14c, each mounted so as to pivot about a horizontal axis which itself pivots about a vertical axis in order to ensure the displacement direction of the complete manipulator. A horizontal pulley 48a, 48b, 38c is associated with each vertical axis. These pulleys 48 are rotated by three cables 49, which leads to the same pivotal movement for the wheels as that of shaft 2 about its vertical axis 3, due to the transmission system 50.

Figures 11A, 11B:
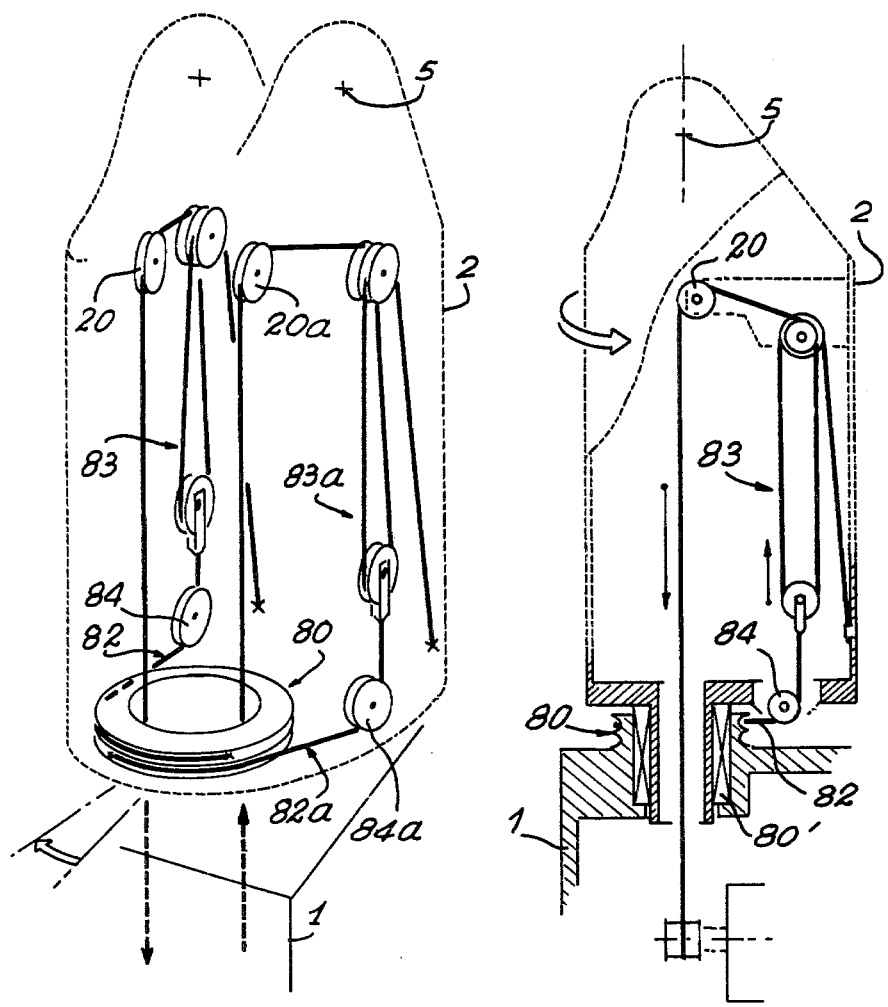
FIGS. 11a and b a constructional variant of the shaft rotation control.

Thus, when it is desired to advance body 1, i.e. the complete autonomous manipulator in a given direction, it is merely necessary to control the rotation of at least one of these driving wheels for said displacement to take place in the plane indicated by the manipulator component. This leads not only to the economy of one movement, but also to a control economy. It is merely necessary to control the advance or return of the vehicle, whose body 1 remains parallel to itself. As a variant, when working in front of a table, it may be preferred to place the three wheels 48 perpendicular to the plane of the arm and then give a transverse displacement parallel to the table. Maintaining a parallelism leads to the advantage when control is by a computer that the manipulator does not change the angular reference. FIGS. 11a and 11b show a constructional variant of the rotational control of shaft 2 about its vertical axis 3.

According to this variant, a pulley 80 fixed to body 1 is concentric to the axis 3 and receives via bearings 80' the base 81 of the shaft which is free in rotation.

Opposing cables 82 and 82' fixed by one of their ends to pulley 80 are attached by their other end of the blocks 83 and 83' following an angle return on pulleys 84, 84'. The fixed train of these blocks is integral with the upper end of the shaft, whereas the two other blocks of said shaft have their fixed train attached to the lower part of the shaft. The strands leaving blocks 83, 83' pass into the central cable layer by means of pulleys such as 20, 20a identical to those of the other blocks, before travelling towards the motor associated with this movement, which is located in body 1.

Figure 8B:
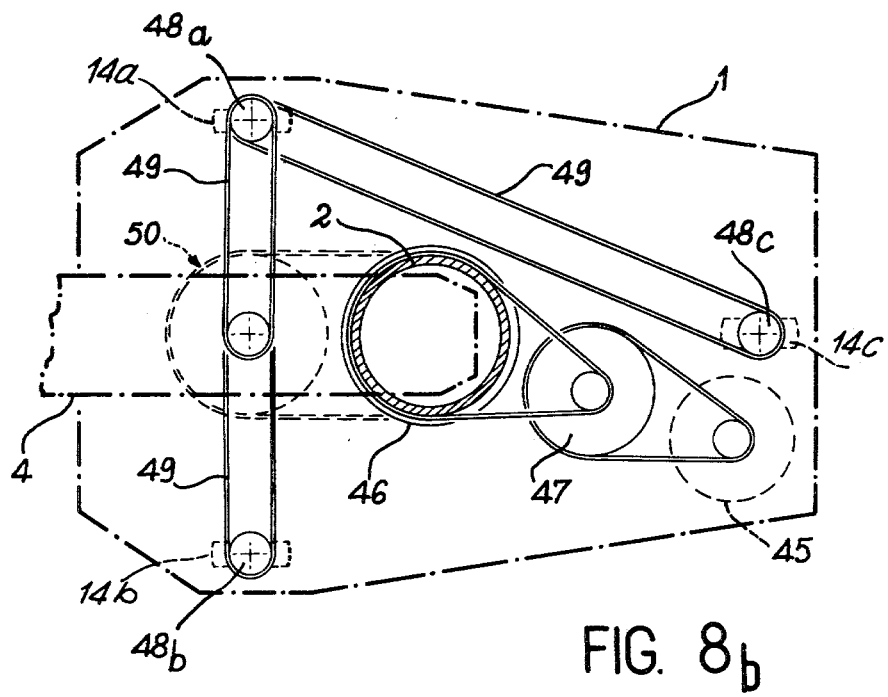
FIG. 8b a plan view of the manipulator base showing a variant thereof in which there is a connection between the rotary movement of the wheels on said base and the rotation of the manipulator shaft.

The interest of this variant is that it permits a reduction by block of a high ratio, which in the solution shown in FIG. 8b requires two pulley stages, which makes it difficult to regulate the tension of the cables.

In conclusion, it is pointed out that the manipulator according to the invention provides the possibility of bringing about total independence between the orientation movement of the tongs and the positioning movements. Thus, on referring to FIG. 1, it can be seen that during the overall rotation by means of shaft 2, the complete arm performs a rotation at the same time as the latter pivots about the overall rotation axis 3. It is merely necessary to carry out a rotation of the same angle of forearm 9 about axis 10 for the tongs 12 to remain strictly parallel to themselves. It is easy to control the direction of this rotation movement about axis 10 by means of a control system which does not use the potentiometer of the motor actuated as a reference, but instead the difference between the latter and the potentiometer which locates the overall rotation of shaft 2 about axis 3. This subtraction can be obtained by a return of not shown supplementary pulleys which falls within the scope of the non-inventive activity of the expert.

On considering the most preferred embodiment of the manipulator according to the invention, it is clear that the computer responsible for the resolution of the coordinates of the manipulator now only has to resolve the articulated assembly 4 and 6 in the rotation of the plane of the manipulator about axis 3, which can be carried out by a very simple calculation, whereby any movement of the shaft, the shoulder or the elbow leads to no change in the direction of tongs 12. Thus, the inverse resolution of the manipulator is greatly simplified for the computer.

However, in the case of usage without a computer it is possible to take advantage of an auxiliary control of the forearm or lower arm 9 abouts its pivot axis 8 with respect to the intermediate arm in order to obtain a better approach of the tongs in a congested space.

Figure 9:
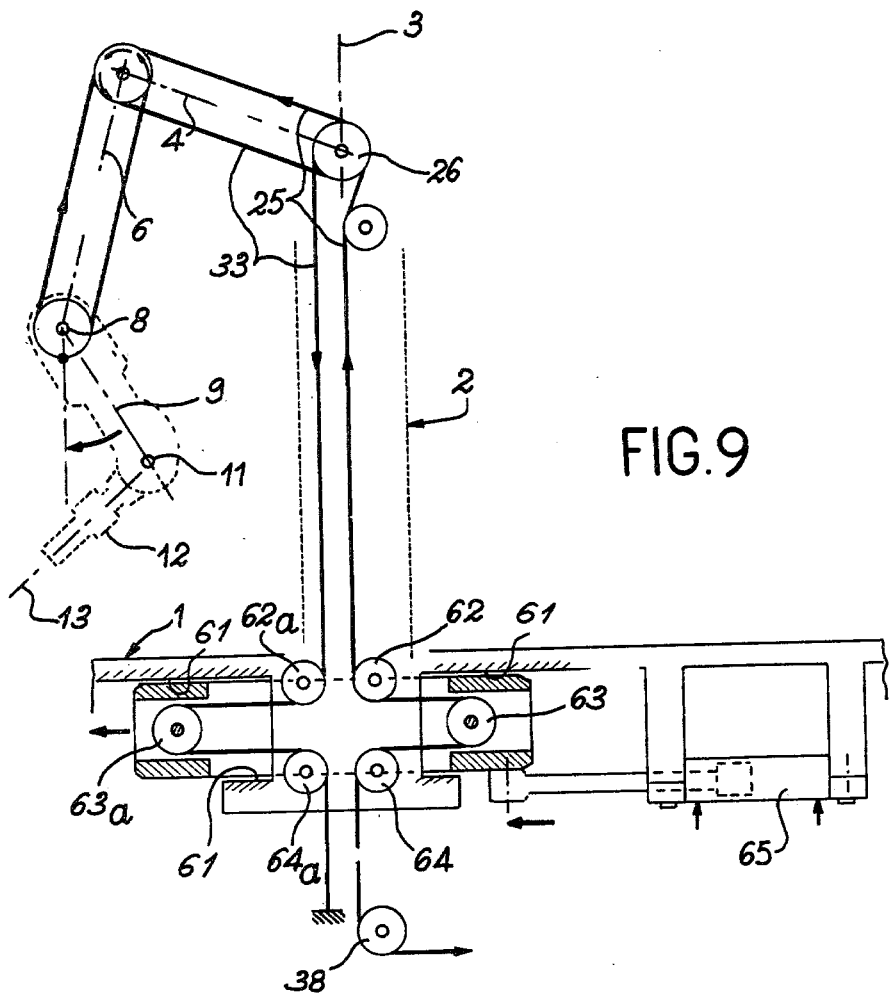
FIG. 9 an exemplified embodiment of the pivoting control of the forearm about the first axis.

FIG. 9 shows an embodiment of this auxiliary control. A movable slide valve of axis 60 coinciding with axis 3 of the shaft and guided by slides 61 fixed to body 1 is placed in the latter. This slide valve can be moved by an actuating member 65 of the irreversible jack type (for example a screw jack) which is fixed to body 1 and to slide valve 60. The opposing cable or cables 33 coming from the double-grooved pulley 26 is maintained in the vicinity of axis 3 by return pulley 62a, 64a. It passes onto pulley 63a fixed to slide valve 60 and the leaving strand is fixed to body 1. In the same way, the layer of cables 25 leaving pulleys 26 passes onto return pulleys 62, 64 and onto pulley 63, then passes onto pulleys 38 and onto the control motors. It is clear that by acting on slide valve 60, by modifying equal and opposing lengths on strands 33 and 25, the angle formed by the longitudinal axis of lower arm 9 and axis 3 of shaft 2 is modified. However, by leaving the slide valve stationary said angle remains constant when controlling cables 25 in order to act on tongs 12 or on the upper or intermediate arms as shown in FIG. 4.

Figure 10:
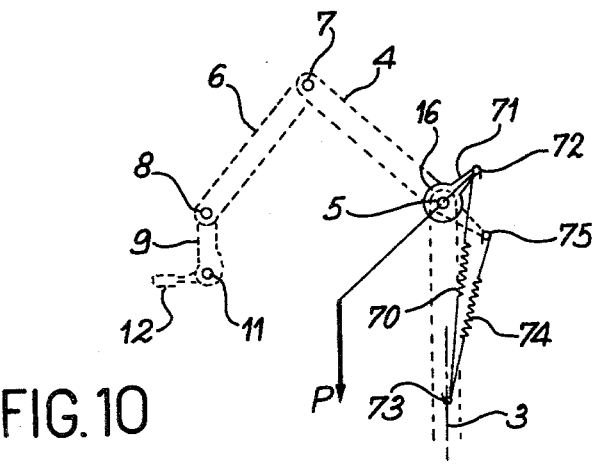
FIG. 10 an exemplified embodiment of the balancing of the moving parts of the manipulator.

FIG. 10 shows a method of balancing the upper and intermediate arms when axis 3 of shaft 2 is vertical, the balancing of tongs 12 about axis 11 being ignored. Under these conditions, a balancing by springs is possible. A spring 70 attached by one end 72 to a lever 71 of pulley 16 parallel to the axis of intermediate arm 6 applies the torque of said intermediate arm 6 and the fixed weight level with axis 8, which is equivalent to the weight P shown by dotted lines (in FIG. 10) in the extension of lever 71.

It is known that by choosing the stretching coefficient of spring 70 and its length between attachment point 72 and attachment point 73 disposed in the vertical plane containing axis 5, it is possible to strictly balance the weight P at an angular position of lever 71 during normal operation. In practice, spring 70 is placed on one side externally of shaft 2.

In the same way, a second spring 74 positioned on the other side of shaft 2 attached to point 75 in the extension of the axis of upper arm 4 balances the weight of upper arm 4 and the constant weight due to the intermediate arm 6 and due to the lower arm 9 considered as applied to axis 7.

The invention is not limited to the embodiments described and represented hereinbefore and various modifications can be made thereto without passing beyond the scope of the invention.

What is claimed is:

1. A manipulator, wherein it comprises a body, a shaft which rotates about its longitudinal axis with respect to said body, an upper arm articulated to the end of the shaft about a shoulder axis orthogonal to the longitudinal axis of the shaft and to the longitudinal axis of the arm, an intermediate arm directly articulated to the end of the upper arm about an elbow axis parallel to the shoulder axis, a forearm articulated to the end of the intermediate arm about a third axis parallel to the elbow axis, said forearm being able to rotate about its longitudinal axis, a tool having a longitudinal axis mounted in pivotal manner at the end of said forearm about an axis perpendicular to the plane defined by the longitudinal axes of the forearm and tool, the tool being able to rotate about its longitudinal axis and a plurality of motors fixed to the body and transmission means by cables and pulleys for transmitting the control movements of the motors to the corresponding moving members of the manipulator, wherein the body is mounted on wheels and wherein it comprises a drive motor for rotating the said shaft with respect to the body about its longitudinal axis and transmission means for linking the rotation of said shaft with the rotation of said wheels about their vertical pivot axes in such a way that the common direction taken by the wheels coincides with the projection on the displacement plane of the manipulator of the direction of the longitudinal axis of the arm.

2. A manipulator according to claim 1, wherein the transmission means comprise means for maintaining the longitudinal axis of the forearm parallel to the axis of the shaft, no matter what other movements take place.

3. A manipulator according to claim 2, wherein the said means comprise at least one cable or line fixed to the shaft and the forearm and passing over pulleys of the same diameter mounted respectively on the shoulder axis, the elbow axis and the third axis.

4. A manipulator according to claim 1, wherein the transmission means comprise means mounted on said body to give a given regulatable value to the angle between the longitudinal axis of the forearm and the shaft axis and to maintain said angle constant, no matter what other movements take place.

5. A manipulator according to claim 4, wherein the means for giving the said angle a given regulatable value comprise a slide valve which can be displaced with respect to said body in a plane perpendicular to the axis of the shaft, said slide valve being mounted in said body between the shaft and the motors, said slide valve having a first system of pulleys over which pass the cables or lines controlling the movements of the forearm and the tool and a second system of pulleys over which pass the cables or lines opposing the aforementioned cables or lines, whereby said cables or lines pass over pulleys of the same diameter mounted with respect to the shoulder axis, the elbow axis and the third axis and over return pulleys in a direction parallel to the axis of the shaft integral with the body and placed on either side of the slide valve.

6. A manipulator according to claim 1, wherein the rotation movement of the forearm about its longitudinal axis and the movements of the tool with respect to the forearm are in each case controlled by two opposing cable or line strands, the end of the opposing strands associated with one and the same movements being integral with the moving part of two opposing blocks, whose fixed parts are integral with said bodies, the free ends of the strands of the opposing blocks being fixed to a capstan driven by a motor, the motors associated with said movements and the tool opening movement being fixed to a vertical partition of the said body.

7. A manipulator according to claim 1, wherein the rotation axis of the shaft is vertical and wherein it comprises balancing means constituted by a first spring, whose first end is fixed to a lever pivoting about the shoulder axis and forced to stay parallel to the longitudinal axis of the intermediate arm and whose other end is fixed to the shaft and a second spring whose one end is fixed to a lever forming an extension of the longitudinal axis of the other arm and whose other end is fixed to the shaft.

8. A manipulator according to claim 1, wherein the means for rotating the shaft about its axis with respect to the body comprise a pulley fixed to the body and whose axis coincides with that of the shaft and two opposing strands, whose one end is fixed to the pulley, whereby each of which passes over a block and whose other end is fixed to the associated drive motor.

9. A motorized manipulator, wherein it comprises a body, a shaft (2) which rotates about its longitudinal axis (3) with respect to said body, an upper arm (4) articulated to the end of the shaft about a shoulder axis (5) orthogonal to the longitudinal axis of the shaft and to the longitudinal axis of the arm, an intermediate arm (6) directly articulated to the end of the upper arm about an elbow axis (7) parallel to the shoulder axis, a forearm (9) articulated to the end of the intermediate arm about another axis (8) parallel to the elbow axis, said forearm being able to rotate about its longitudinal axis, a tool (12) having a longitudinal axis (13) mounted in pivotal manner at the end of said forearm about an axis (11) perpendicular to the plane defined by the longitudinal axes of the forearm and tool, the tool being able to rotate about its longitudinal axis, a plurality of motors (22, 22', 23) fixed within the body and transmission means by cables and pulleys for transmitting the control movements of the motors to the corresponding moving members of the manipulator, at least the rotation movement of the forearm about its longitudinal axis and the movements of the tool with respect to the forearm being in each case controlled by at least one cable or line strand passing over first pulleys of the same diameter mounted respectively on the shoulder axis, the elbow axis and the another axis, at least one opposing cable or line strand passing over second pulleys of the same diameter as the first pulleys, mounted respectively on the shoulder axis, the elbow axis and the another axis, said at least one opposing cable or line strand being mounted in an opposing path with respect to said at least one cable or line strand, to balance tension of the latter and maintain the angle between the longitudinal axis of the forearm and the longitudinal axis of the shaft to a given value.

10. A manipulator according to claim 9, wherein the at least one cable or line strand controlling at least the rotation movement of the forearm about its longitudinal axis and the movements of the tool with respect to the forearm are in each case fixed to the movable part of a block controlled by a strand having one end fixed to the body and the other end fixed to a capstan driven by a motor.

11. A manipulator according to claim 9, wherein the means for rotating the shaft about its axis with respect to the body comprise a pulley fixed to the body and whose axis coincides with that of the shaft and two opposing strands, whose one end is fixed to the pulley, whereby each of which passes over a block and whose other end is fixed to the associated drive motor.

12. A manipulator according to claim 9, wherein the body is mounted on wheels and wherein it comprises a drive motor for rotating the said shaft with respect to the body about its longitudinal axis and transmission means for linking the rotation of said shaft with the rotation of said wheels about their vertical pivot axes.

13. A manipulator according to claim 9, wherein means are provided for regulating the angle between the longitudinal axis of the forearm and the longitudinal axis of the shaft, said means comprising a slide valve which can be displaced with respect to said body in a plane perpendicular to the axis of the shaft, said slide valve being mounted in said body between the shaft and the motors, said slide valve having a first system of pulleys over which pass said at least one cable or line strand controlling at least the movements of the forearm and the tool and a second system of pulleys over which pass the at least one opposing cable or line strand, whereby said opposing cable or line strand passes over pulleys of the same diameter mounted with respect to the shoulder axis, the elbow axis and the another axis and over return pulleys in a direction parallel to the axis of the shaft integral with the body and placed on either side of the slide valve.

* * * * *